(12) United States Patent
Hua

(10) Patent No.: US 12,744,490 B2
(45) Date of Patent: Sep. 22, 2026

(54) ROOF RIDGE JOINER FOR WIREWAYS OF ROOFING SYSTEMS

(71) Applicant: GAF Energy LLC, Parsippany, NJ (US)

(72) Inventor: Dan Hua, San Jose, CA (US)

(73) Assignee: GAF Energy LLC, Parsippany, NJ (US)

( * ) Notice: Subject to any disclaimer, the term of this patent is extended or adjusted under 35 U.S.C. 154(b) by 0 days.

(21) Appl. No.: 18/830,302

(22) Filed: Sep. 10, 2024

(65) Prior Publication Data

US 2025/0088138 A1 Mar. 13, 2025

Related U.S. Application Data

(60) Provisional application No. 63/582,173, filed on Sep. 12, 2023.

(51) Int. Cl.

*H02S 20/25* (2014.01)
*E04D 1/30* (2006.01)
*H02S 40/36* (2014.01)

(52) U.S. Cl.

CPC ................ *H02S 20/25* (2014.12); *E04D 1/30* (2013.01); *H02S 40/36* (2014.12); *E04D 2001/305* (2013.01); *E04D 2001/308* (2013.01)

(58) Field of Classification Search

CPC .......... Y02B 10/12; Y02E 10/50; Y02E 10/44
See application file for complete search history.

(56) References Cited

U.S. PATENT DOCUMENTS 1,653,847 A * 12/1927 Greenstreet ............... E04D 3/40 52/529
1,981,467 A 11/1934 Radtke
2,255,247 A * 9/1941 Gabriel ................ E04D 13/155 52/278
3,156,497 A 11/1964 Lessard
3,581,779 A 6/1971 Gilbert, Jr.
4,015,374 A * 4/1977 Epstein .................... E04D 1/36 D25/139

(Continued)

FOREIGN PATENT DOCUMENTS

CA 2829440 A 5/2019
CA 3091065 A1 * 2/2022 ......... A62B 35/0068

(Continued)

OTHER PUBLICATIONS

Sunflare, Procducts: “Sunflare Develops Prototype For New Residential Solar Shingles”; 2019 <<sunflaresolar.com/news/sunflare-develops-prototype-for-new-residential-solar-shingles> retrieved Feb. 2, 2021.

(Continued)

*Primary Examiner* — Babajide A Demuren
(74) *Attorney, Agent, or Firm* — GREENBERG TRAURIG, LLP

(57) ABSTRACT

A system includes a steep sloped roof having a roof deck, a ridge, and a ridge cap installed on the ridge. A plurality of photovoltaic modules is installed on the roof deck and arranged in an array. The array includes a first side. A wireway is installed proximate to the first side of the array and a cover is installed on the wireway. The cover includes an upper end that overlays at least a portion of the ridge cap.

19 Claims, 9 Drawing Sheets

(56) References Cited

U.S. PATENT DOCUMENTS 4,258,948 A 3/1981 Hoffmann
4,322,924 A * 4/1982 Cooper .................... E04D 3/40 52/465
4,349,220 A 9/1982 Carroll et al.
4,499,702 A 2/1985 Turner
4,532,739 A * 8/1985 Cooper ................ E04D 1/2914 52/465
4,636,577 A 1/1987 Peterpaul
5,167,579 A 12/1992 Rotter
5,212,913 A * 5/1993 Whitehead ............... E04D 3/40 52/57
5,437,735 A 8/1995 Younan et al.
5,590,495 A 1/1997 Bressler et al.
5,642,596 A 7/1997 Waddington
6,008,450 A 12/1999 Ohtsuka et al.
6,033,270 A 3/2000 Stuart
6,046,399 A 4/2000 Kapner
6,201,180 B1 3/2001 Meyer et al.
6,220,329 B1 4/2001 King et al.
6,308,482 B1 10/2001 Strait
6,320,114 B1 11/2001 Kuechler
6,320,115 B1 11/2001 Kataoka et al.
6,336,304 B1 1/2002 Mimura et al.
6,341,454 B1 1/2002 Koleoglou
6,407,329 B1 6/2002 Iino et al.
6,576,830 B2 6/2003 Nagao et al.
6,928,781 B2 8/2005 Desbois et al.
6,972,367 B2 12/2005 Federspiel et al.
7,138,578 B2 11/2006 Komamine
7,155,870 B2 1/2007 Almy
7,178,295 B2 2/2007 Dinwoodie
7,487,771 B1 2/2009 Eiffert et al.
7,587,864 B2 9/2009 McCaskill et al.
7,678,990 B2 3/2010 McCaskill et al.
7,678,991 B2 3/2010 McCaskill et al.
7,748,191 B2 7/2010 Podirsky
7,819,114 B2 10/2010 Augenbraun et al.
7,824,191 B1 11/2010 Podirsky
7,832,176 B2 11/2010 McCaskill et al.
8,118,109 B1 2/2012 Hacker
8,168,880 B2 5/2012 Jacobs et al.
8,173,889 B2 5/2012 Kalkanoglu et al.
8,210,570 B1 7/2012 Railkar et al.
8,276,329 B2 10/2012 Lenox
8,312,693 B2 11/2012 Cappelli
8,319,093 B2 11/2012 Kalkanoglu et al.
8,333,040 B2 12/2012 Shiao et al.
8,371,076 B2 2/2013 Jones et al.
8,375,653 B2 2/2013 Shiao et al.
8,404,967 B2 3/2013 Kalkanoglu et al.
8,410,349 B2 4/2013 Kalkanoglu et al.
8,418,415 B2 4/2013 Shiao et al.
8,438,796 B2 5/2013 Shiao et al.
8,468,754 B2 6/2013 Railkar et al.
8,468,757 B2 6/2013 Krause et al.
8,505,249 B2 8/2013 Geary
8,512,866 B2 8/2013 Taylor
8,513,517 B2 8/2013 Kalkanoglu et al.
8,586,856 B2 11/2013 Kalkanoglu et al.
8,601,754 B2 12/2013 Jenkins et al.
8,629,578 B2 1/2014 Kurs et al.
8,646,228 B2 2/2014 Jenkins
8,656,657 B2 2/2014 Livsey et al.
8,671,630 B2 3/2014 Lena et al.
8,677,702 B2 3/2014 Jenkins
8,695,289 B2 4/2014 Koch et al.
8,713,858 B1 5/2014 Xie
8,713,860 B2 5/2014 Railkar et al.
8,733,038 B2 5/2014 Kalkanoglu et al.
8,776,455 B2 7/2014 Azoulay
8,789,321 B2 7/2014 Ishida
8,793,940 B2 8/2014 Kalkanoglu et al.
8,793,941 B2 8/2014 Bosler et al.
8,826,607 B2 9/2014 Shiao et al.
8,835,751 B2 9/2014 Kalkanoglu et al.
8,863,451 B2 10/2014 Jenkins et al.
8,898,970 B2 12/2014 Jenkins et al.
8,925,262 B2 1/2015 Railkar et al.
8,943,766 B2 2/2015 Gombarick et al.
8,946,544 B2 2/2015 Jabos et al.
8,950,128 B2 2/2015 Kalkanoglu et al.
8,959,848 B2 2/2015 Jenkins et al.
8,966,838 B2 3/2015 Jenkins
8,966,850 B2 3/2015 Jenkins et al.
8,994,224 B2 3/2015 Mehta et al.
9,032,672 B2 5/2015 Livsey et al.
9,153,950 B2 10/2015 Yamanaka et al.
9,166,087 B2 10/2015 Chihlas et al.
9,169,646 B2 10/2015 Rodrigues et al.
9,170,034 B2 10/2015 Bosler et al.
9,178,465 B2 11/2015 Shiao et al.
9,202,955 B2 12/2015 Livsey et al.
9,212,832 B2 12/2015 Jenkins
9,217,584 B2 12/2015 Kalkanoglu et al.
9,270,221 B2 2/2016 Zhao
9,273,885 B2 3/2016 Rodrigues et al.
9,276,141 B2 3/2016 Kalkanoglu et al.
9,331,224 B2 5/2016 Koch et al.
9,356,174 B2 5/2016 Duarte et al.
9,359,014 B1 6/2016 Yang et al.
9,404,262 B1 * 8/2016 Smith, Jr. ............ E04D 3/3608
9,412,890 B1 8/2016 Meyers
9,528,270 B2 12/2016 Jenkins et al.
9,605,432 B1 3/2017 Robbins
9,711,672 B2 7/2017 Wang
9,755,573 B2 9/2017 Livsey et al.
9,786,802 B2 10/2017 Shiao et al.
9,831,818 B2 11/2017 West
9,912,284 B2 3/2018 Svec
9,923,515 B2 3/2018 Rodrigues et al.
9,938,729 B2 4/2018 Coon
9,991,412 B2 6/2018 Gonzalez et al.
9,998,067 B2 6/2018 Kalkanoglu et al.
10,027,273 B2 7/2018 West et al.
10,115,850 B2 10/2018 Rodrigues et al.
10,128,660 B1 11/2018 Apte et al.
10,156,075 B1 12/2018 McDonough
10,187,005 B2 1/2019 Rodrigues et al.
10,256,765 B2 4/2019 Rodrigues et al.
10,284,136 B1 5/2019 Mayfield et al.
10,454,408 B2 10/2019 Livsey et al.
10,530,292 B1 1/2020 Cropper et al.
10,560,048 B2 2/2020 Fisher et al.
10,563,406 B2 2/2020 Kalkanoglu et al.
D879,031 S 3/2020 Lance et al.
10,579,028 B1 3/2020 Jacob
10,784,813 B2 9/2020 Kalkanoglu et al.
D904,289 S 12/2020 Lance et al.
11,012,026 B2 5/2021 Kalkanoglu et al.
11,085,187 B2 8/2021 Grubka et al.
11,177,639 B1 11/2021 Nguyen et al.
11,217,715 B2 1/2022 Sharenko et al.
11,251,744 B1 2/2022 Bunea et al.
11,258,399 B2 2/2022 Kalkanoglu et al.
11,283,394 B2 3/2022 Perkins et al.
11,309,828 B2 4/2022 Sirski et al.
11,394,344 B2 7/2022 Perkins et al.
11,424,379 B2 8/2022 Sharenko et al.
11,431,280 B2 8/2022 Liu et al.
11,431,281 B2 8/2022 Perkins et al.
11,444,569 B2 9/2022 Clemente et al.
11,454,027 B2 9/2022 Kuiper et al.
11,459,757 B2 10/2022 Nguyen et al.
11,486,144 B2 11/2022 Bunea et al.
11,489,482 B2 11/2022 Peterson et al.
11,496,088 B2 11/2022 Sirski et al.
11,508,861 B1 11/2022 Perkins et al.
11,512,480 B1 11/2022 Achor et al.
11,527,665 B2 12/2022 Boitnott
11,545,927 B2 1/2023 Abra et al.
11,545,928 B2 1/2023 Perkins et al.
11,658,470 B2 5/2023 Nguyen et al.
11,661,745 B2 5/2023 Bunea et al.
11,689,149 B2 6/2023 Clemente et al.

(56) References Cited

U.S. PATENT DOCUMENTS 11,705,531 B2 7/2023 Sharenko et al.
11,728,759 B2 8/2023 Nguyen et al.
11,732,490 B2 8/2023 Achor et al.
11,811,361 B1 11/2023 Farhangi et al.
11,824,486 B2 11/2023 Nguyen et al.
11,824,487 B2 11/2023 Nguyen et al.
11,843,067 B2 12/2023 Nguyen et al.
2002/0053360 A1 5/2002 Kinoshita et al.
2002/0129849 A1 9/2002 Heckeroth
2003/0101662 A1 6/2003 Ullman
2003/0132265 A1 7/2003 Villela et al.
2003/0217768 A1 11/2003 Guha
2004/0000334 A1 1/2004 Ressler
2005/0030187 A1 2/2005 Peress et al.
2005/0115603 A1 6/2005 Yoshida et al.
2005/0144870 A1 7/2005 Dinwoodie
2005/0178428 A1 8/2005 Laaly et al.
2005/0193673 A1 9/2005 Rodrigues et al.
2006/0042683 A1 3/2006 Gangemi
2006/0046084 A1 3/2006 Yang et al.
2007/0074754 A1* 4/2007 Farquhar ................ F24S 20/67 136/244
2007/0074757 A1 4/2007 Mellott et al.
2007/0181174 A1 8/2007 Ressler
2007/0193618 A1 8/2007 Bressler et al.
2007/0249194 A1 10/2007 Liao
2007/0295385 A1 12/2007 Sheats et al.
2008/0006323 A1 1/2008 Kalkanoglu et al.
2008/0035140 A1 2/2008 Placer et al.
2008/0078440 A1 4/2008 Lim et al.
2008/0185748 A1 8/2008 Kalkanoglu
2008/0271774 A1 11/2008 Kalkanoglu et al.
2008/0302030 A1 12/2008 Stancel et al.
2008/0302408 A1* 12/2008 Bressler ................. H02S 20/25 136/251
2008/0315061 A1 12/2008 Fath
2009/0000222 A1 1/2009 Kalkanoglu et al.
2009/0014057 A1 1/2009 Croft et al.
2009/0014058 A1 1/2009 Croft et al.
2009/0019795 A1 1/2009 Szacsvay et al.
2009/0044850 A1 2/2009 Kimberley
2009/0114261 A1 5/2009 Stancel et al.
2009/0133340 A1 5/2009 Shiao et al.
2009/0159118 A1 6/2009 Kalkanoglu et al.
2009/0178350 A1 7/2009 Kalkanoglu et al.
2009/0229652 A1 9/2009 Mapel et al.
2009/0275247 A1 11/2009 Richter et al.
2010/0019580 A1 1/2010 Croft et al.
2010/0095618 A1 4/2010 Edison et al.
2010/0101634 A1 4/2010 Frank et al.
2010/0116325 A1 5/2010 Nikoonahad
2010/0131108 A1 5/2010 Meyer
2010/0132305 A1* 6/2010 Heckeroth ............. H02S 20/23 136/244
2010/0139184 A1 6/2010 Williams et al.
2010/0146878 A1 6/2010 Koch et al.
2010/0159221 A1 6/2010 Kourtakis et al.
2010/0170169 A1 7/2010 Railkar et al.
2010/0186798 A1 7/2010 Tormen et al.
2010/0242381 A1 9/2010 Jenkins
2010/0313499 A1 12/2010 Gangemi
2010/0325976 A1 12/2010 DeGenfelder et al.
2010/0326488 A1 12/2010 Aue et al.
2010/0326501 A1 12/2010 Zhao et al.
2011/0030761 A1 2/2011 Kalkanoglu et al.
2011/0036386 A1 2/2011 Browder
2011/0036389 A1 2/2011 Hardikar et al.
2011/0048507 A1 3/2011 Livsey et al.
2011/0058337 A1 3/2011 Han et al.
2011/0061326 A1 3/2011 Jenkins
2011/0100436 A1 5/2011 Cleereman et al.
2011/0104488 A1 5/2011 Muessig et al.
2011/0132427 A1 6/2011 Kalkanoglu et al.
2011/0168238 A1 7/2011 Metin et al.
2011/0209433 A1* 9/2011 Polumbus ................ E04D 3/40 52/745.21
2011/0239555 A1 10/2011 Cook et al.
2011/0302859 A1 12/2011 Crasnianski
2011/0314753 A1 12/2011 Farmer et al.
2012/0034799 A1 2/2012 Hunt
2012/0060434 A1 3/2012 Jacobs
2012/0060902 A1 3/2012 Drake
2012/0085392 A1 4/2012 Albert et al.
2012/0137600 A1 6/2012 Jenkins
2012/0151855 A1* 6/2012 Malpas .................. H02S 20/26 52/173.3
2012/0176077 A1 7/2012 Oh et al.
2012/0212065 A1 8/2012 Cheng et al.
2012/0233940 A1 9/2012 Perkins et al.
2012/0240490 A1 9/2012 Gangemi
2012/0260977 A1 10/2012 Stancel
2012/0266942 A1 10/2012 Komatsu et al.
2012/0279150 A1 11/2012 Pislkak et al.
2012/0282437 A1 11/2012 Clark et al.
2012/0291848 A1 11/2012 Sherman et al.
2013/0008499 A1 1/2013 Verger et al.
2013/0014455 A1 1/2013 Grieco
2013/0118558 A1 5/2013 Sherman
2013/0193769 A1 8/2013 Mehta et al.
2013/0247988 A1 9/2013 Reese et al.
2013/0284267 A1 10/2013 Plug et al.
2013/0306137 A1 11/2013 Ko
2014/0090697 A1 4/2014 Rodrigues et al.
2014/0150843 A1 6/2014 Pearce et al.
2014/0173997 A1 6/2014 Jenkins
2014/0179220 A1 6/2014 Railkar et al.
2014/0182222 A1 7/2014 Kalkanoglu et al.
2014/0208675 A1 7/2014 Beerer et al.
2014/0254776 A1 9/2014 O'Connor et al.
2014/0266289 A1 9/2014 Della Sera et al.
2014/0311556 A1 10/2014 Feng et al.
2014/0352760 A1 12/2014 Haynes et al.
2014/0366464 A1 12/2014 Rodrigues et al.
2015/0089895 A1 4/2015 Leitch
2015/0162459 A1 6/2015 Lu et al.
2015/0340516 A1 11/2015 Kim et al.
2015/0349173 A1 12/2015 Morad et al.
2016/0105144 A1* 4/2016 Haynes .................. H02S 20/26 136/244
2016/0142008 A1 5/2016 Lopez et al.
2016/0254776 A1 9/2016 Rodrigues et al.
2016/0276508 A1 9/2016 Huang et al.
2016/0359451 A1 12/2016 Mao et al.
2017/0159292 A1 6/2017 Chihlas et al.
2017/0179319 A1 6/2017 Yamashita et al.
2017/0179726 A1 6/2017 Garrity et al.
2017/0237390 A1 8/2017 Hudson et al.
2017/0331415 A1 11/2017 Koppi et al.
2018/0094438 A1 4/2018 Wu et al.
2018/0097472 A1 4/2018 Anderson et al.
2018/0115275 A1 4/2018 Flanigan et al.
2018/0254738 A1 9/2018 Yang et al.
2018/0294765 A1 10/2018 Friedrich et al.
2018/0351502 A1 12/2018 Almy et al.
2018/0367089 A1 12/2018 Stutterheim et al.
2019/0030867 A1 1/2019 Sun et al.
2019/0081436 A1 3/2019 Onodi et al.
2019/0123679 A1 4/2019 Rodrigues et al.
2019/0253022 A1 8/2019 Hardar et al.
2019/0305717 A1 10/2019 Allen et al.
2020/0109320 A1 4/2020 Jiang
2020/0144958 A1 5/2020 Rodrigues et al.
2020/0220819 A1 7/2020 Vu et al.
2020/0224419 A1 7/2020 Boss et al.
2020/0343397 A1 10/2020 Hem-Jensen
2021/0083619 A1 3/2021 Hegedus
2021/0115223 A1 4/2021 Bonekamp et al.
2021/0159353 A1 5/2021 Li et al.
2021/0301536 A1 9/2021 Baggs et al.

(56) References Cited

U.S. PATENT DOCUMENTS

| | | | |
|---|---|---|---|
| 2021/0343886 | A1 | 11/2021 | Sharenko et al. |
| 2022/0149213 | A1 | 5/2022 | Mensink et al. |

FOREIGN PATENT DOCUMENTS

| | | | | | |
|---|---|---|---|---|---|
| CH | 700095 | A2 | | 6/2010 | |
| CN | 202797032 | U | | 3/2013 | |
| CN | 217150978 | U | | 8/2022 | |
| DE | 1958248 | A1 | | 11/1971 | |
| DE | 202007016367 | U1 | * | 3/2008 | ............... F24J 2/045 |
| EP | 1039361 | A1 | | 9/2000 | |
| EP | 1837162 | A1 | | 9/2007 | |
| EP | 1774372 | A1 | | 7/2011 | |
| EP | 244648 | A2 | | 5/2012 | |
| EP | 2784241 | A1 | | 10/2014 | |
| EP | 3772175 | A1 | | 2/2021 | |
| JP | 10046767 | A | | 2/1998 | |
| JP | 2002-106151 | A | | 4/2002 | |
| JP | 2001-098703 | A | | 10/2002 | |
| JP | 2009127327 | A | * | 6/2009 | |
| JP | 2017-027735 | A | | 2/2017 | |
| JP | 2018053707 | A | | 4/2018 | |
| KR | 20090084060 | A | | 8/2009 | |
| KR | 10-1348283 | B1 | | 1/2014 | |
| KR | 10-2019-0000367 | A | | 1/2019 | |
| KR | 10-2253483 | B1 | | 5/2021 | |
| NL | 2026856 | B1 | | 6/2022 | |
| WO | 2010/151777 | A2 | | 12/2010 | |
| WO | 2011/049944 | A1 | | 4/2011 | |
| WO | 2015/133632 | A1 | | 9/2015 | |
| WO | 2018/000589 | A1 | | 1/2018 | |
| WO | 2019/201416 | A1 | | 10/2019 | |
| WO | 2020-159358 | A1 | | 8/2020 | |
| WO | 2021-247098 | A1 | | 12/2021 | |

OTHER PUBLICATIONS

RGS Energy, 3.5KW POWERHOUSE 3.0 system installed in an afternoon; Jun. 7, 2019 <<facebook.com/RGSEnergy/>> retrieved Feb. 2, 2021.

Tesla, Solar Roof <<tesla.com/solarroof>> retrieved Feb. 2, 2021.

"Types of Roofing Underlayment", Owens Corning Roofing; <<https://www.owenscorning.com/en-us/roofing/tools/how-roofing-underlayment-helps-protect-your-home>> retrieved Nov. 1, 2021.

* cited by examiner

A
108
107
110
110
102b
102a
A

ROOF RIDGE JOINER FOR WIREWAYS OF ROOFING SYSTEMS

CROSS-REFERENCE TO RELATED APPLICATIONS

This application is a Section 111(a) application relating to and claiming the benefit of commonly-owned, U.S. Provisional Patent Application Ser. No. 63/582,173, filed Sep. 12, 2023, entitled "ROOF RIDGE JOINER FOR WIREWAYS OF ROOFING SYSTEMS," the contents of which are incorporated herein by reference in its entirety.

FIELD OF THE INVENTION

The present invention relates to roofing systems and, more particularly, photovoltaic systems with wireways and associated roof ridge joiners.

BACKGROUND

Photovoltaic systems are installed on building roofs to generate electricity.

SUMMARY

In some embodiments, a system includes a steep sloped roof, wherein the roof includes a roof deck and a ridge; a ridge cap installed on the ridge; a plurality of photovoltaic modules installed on the roof deck, wherein the plurality of photovoltaic modules is arranged in an array, wherein the array includes a first side; a wireway installed proximate to the first side of the array; and a cover installed on the wireway, wherein the cover includes an upper end, and wherein the upper end overlays at least a portion of the ridge cap.

In some embodiments, the cover includes an elongated body and a tab extending from the body at the upper end, wherein the tab overlays the at least a portion of the ridge cap. In some embodiments, the body includes a top section and side sections extending from the top section wherein the tab includes an upper portion, and wherein the upper portion of the tab extends from the top section of the body. In some embodiments, the body includes a first portion and a second portion attached to the first portion, and wherein the second portion includes the tab. In some embodiments, the second portion is removably attached to the first portion. In some embodiments, the ridge cap includes a first side, and wherein the tab overlays the first side of the ridge cap. In some embodiments, the first side of the ridge cap is sloped.

In some embodiments, the cover is moveable in at least a first direction that extends along the first side of the ridge cap, and wherein the tab is configured to be positioned along the first side of the ridge cap. In some embodiments, the at least a first direction includes a first direction and a second direction opposite the first direction. In some embodiments, the tab is attached to the first side of the ridge cap.

In some embodiments, a system includes a steep sloped roof, wherein the roof includes a roof deck and a ridge; a ridge cap installed on the ridge; a plurality of photovoltaic modules installed on the roof deck, wherein the plurality of photovoltaic modules is arranged in an array, wherein the array includes a first side and a second side opposite the first side; a first wireway installed proximate to the first side of the array; a second wireway installed proximate to the second side of the array; a first cover installed on the first wireway; and a second cover installed on the second wireway, wherein each of the first cover and the second cover includes an upper end, wherein the upper end of the first cover overlays a first portion of the ridge cap, and wherein the upper end of the second cover overlays a second portion of the ridge cap.

In some embodiments, each of the first cover and the second cover includes an elongated body and a tab extending from the body at the upper end thereof, and wherein the tab of the first cover overlays the first portion of the ridge cap and the tab of the second cover overlays the second portion of the ridge cap. In some embodiments, the body of each of the first cover and the second cover includes a first portion and a second portion attached to the first portion of the body, and wherein the second portion of the body includes the tab. In some embodiments, the second portion of the body of each of the first cover and the second cover is removably attached to the first portion of the body. In some embodiments, the ridge cap includes a first side, wherein the tab of the first cover and the tab of the second cover overlay the first side of the ridge cap. In some embodiments, each of the first cover and the second cover is moveable in at least a first direction that extends along the first side of the ridge cap, and wherein each of the tabs of the first cover and the second cover is configured to be positioned along the first side of the ridge cap.

In some embodiments, a system includes a steep sloped roof, wherein the roof includes a roof deck and a ridge, wherein the roof deck includes a first sloped side and a second sloped side, wherein the ridge is between the first sloped side and the second sloped side; a ridge cap installed on the ridge, wherein the ridge cap includes a first side and a second side; a first plurality of photovoltaic modules installed on the first sloped side of the roof deck, wherein the first plurality of photovoltaic modules is arranged in a first array, wherein the first array includes a first side and second side opposite the first side of the first array; a second plurality of photovoltaic modules installed on the second sloped side of the roof deck, wherein the second plurality of photovoltaic modules is arranged in a second array, wherein the second array includes a first side and a second side opposite the first side of the second array; a first wireway installed proximate to the first side of the first array; a first cover installed on the first wireway; a second wireway installed proximate to the second side of the first array; a second cover installed on the second wireway, a third wireway installed proximate to the first side of the second array; a third cover installed on the third wireway; and a fourth wireway installed proximate to the second side of the second array; and a fourth cover installed on the fourth wireway, wherein each of the first cover, the second cover, the third cover and the fourth cover includes an elongated body having an upper end, and a tab extending from the body at the upper end, wherein the tab of the first cover overlays a first portion of the first side of the ridge cap, wherein the tab of the second cover overlays a second portion of the first side of the ridge cap, wherein the tab of the third cover overlays a first portion of the second side of the ridge cap, and wherein the tab of the second cover overlays a second portion of the second side of the ridge cap.

In some embodiments, each of the first cover and the second cover is moveable in at least a first direction that extends along the first side of the ridge cap, wherein each of the tabs of the first cover and the second cover is configured to be positioned along the first side of the ridge cap, wherein each of the third cover and the fourth cover is moveable in at least a second direction that extends along the second side of the ridge cap, and wherein each of the tabs of the third cover and the fourth cover is configured to be positioned along the second side of the ridge cap. In some embodiments, the first cover and the second cover are symmetric with the third cover and the fourth cover. In some embodiments, the first cover and the second cover are asymmetric with the third cover and the fourth cover.

DETAILED DESCRIPTION

Figure 1:
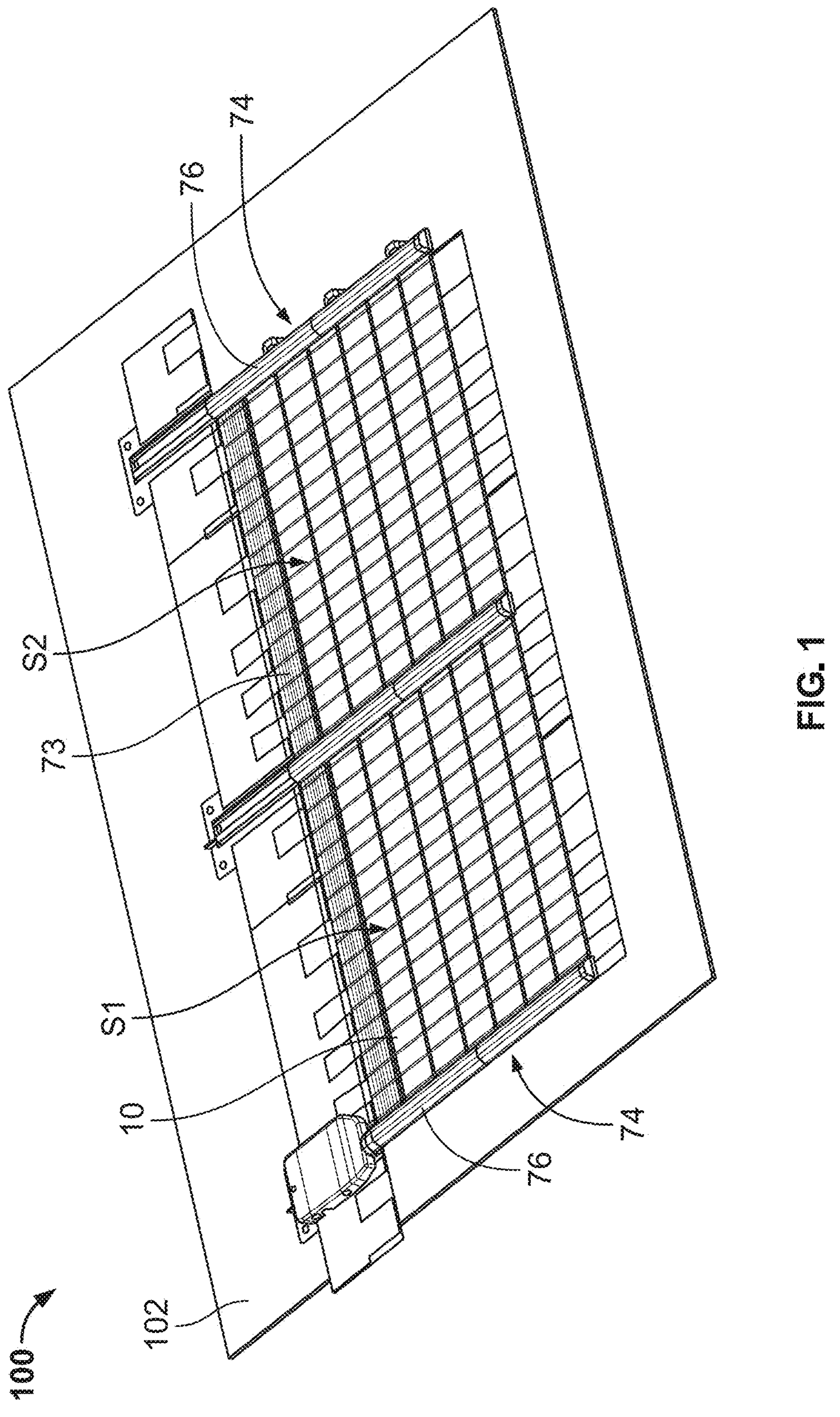
FIG. 1 is top perspective view of some embodiments of a roofing system with a photovoltaic system.
Figure 2:
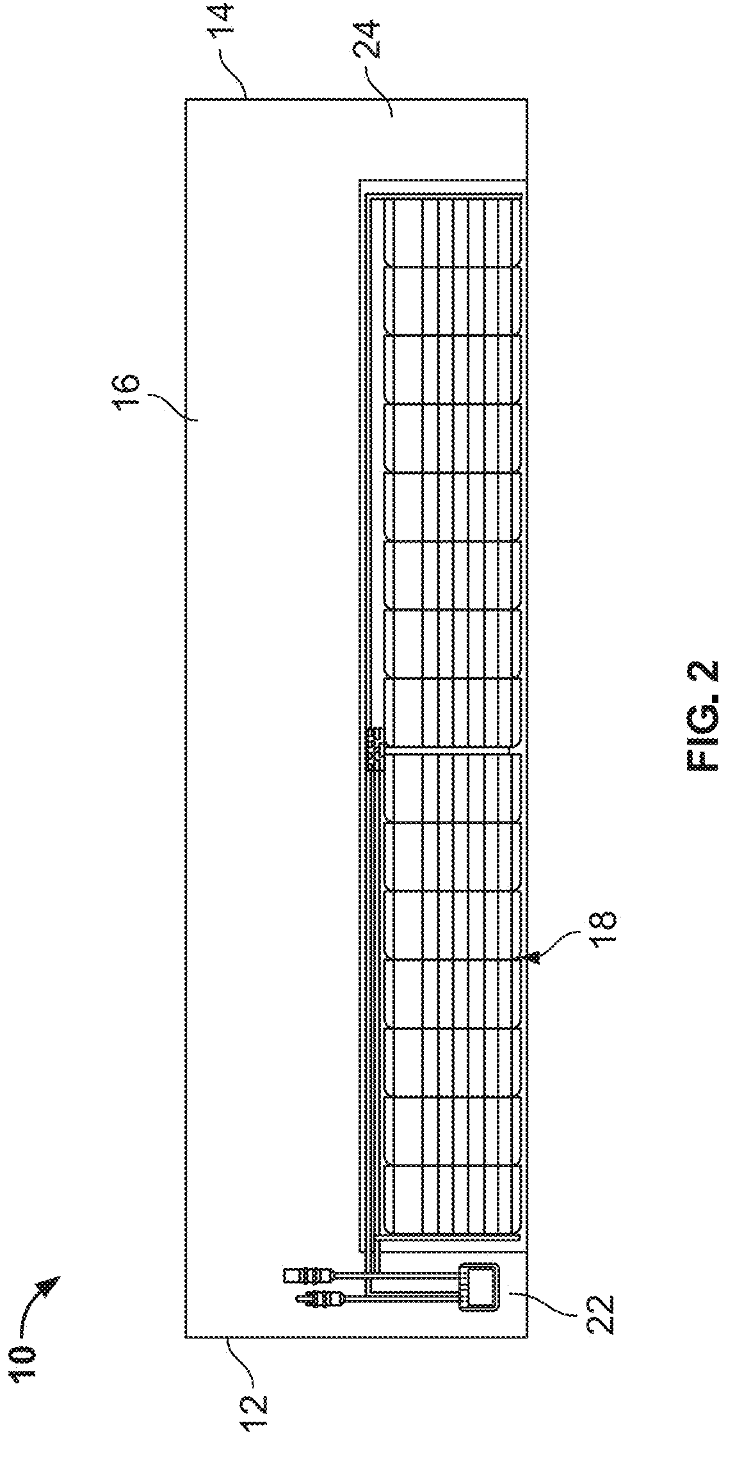
FIG. 2 is a top plan view of some embodiments of a photovoltaic module employed by the photovoltaic system of FIG. 1.

Referring to FIGS. 1 and 2, in some embodiments, a roofing system 100 includes a plurality of roofing modules 10 installed on a roof deck 102 of a roof. In some embodiments, the roof includes a ridge 104 (see FIG. 4). In some embodiments, the roofing modules 10 are photovoltaic modules 10. In some embodiments, each of the photovoltaic modules 10 includes at least one solar cell 20. In some embodiments, each of the photovoltaic modules 10 includes a plurality of solar cells 20. In some embodiments, each of the photovoltaic modules 10 includes a structure, composition, components, and/or function similar to those of one or more embodiments of the photovoltaic modules disclosed in PCT International Patent Publication No. WO 2022/051593, Application No. PCT/US2021/049017, published Mar. 10, 2022, titled "Building Integrated Photovoltaic System," owned by GAF Energy LLC; U.S. Pat. No. 11,251,744 to Bunea et al., issued Feb. 15, 2022, titled "Photovoltaic Shingles and Methods of Installing Same, owned by GAF Energy LLC;" and U.S. Pat. No. 11,870,227, issued Jan. 9, 2024, entitled "Building Integrated Photovoltaic System," owned by GAF Energy LLC, the disclosures of each of which are incorporated by reference herein in their entireties.

In some embodiments, the plurality of the photovoltaic modules 10 is arranged in an array on the roof deck 102. In some embodiments, the array of the photovoltaic modules 10 includes subarrays S1, S2. In certain embodiments, the array includes more than the two subarrays S1, S2. In some embodiments, the array includes a single array S1. In some embodiments, each of the subarrays S1, S2 include a plurality of rows of the photovoltaic modules 10.

In some embodiments, the roof deck 102 is a steep slope roof deck. In some embodiments, the roof deck 102 is a sloped roof deck. In some embodiments, the roof deck 102 is a flat roof deck. As used herein, a "steep slope" roof or roof deck is a roof or roof deck having a pitch of Y/X, where Y and X are in a ratio of 4:12 to 20:12, where Y corresponds to the "rise" of the roof or roof deck, and where X corresponds to the "run" of the roof or roof deck. As used herein, a "sloped" roof or roof deck is a roof or roof deck that is not flat, but has a pitch that is less than the pitch of a steep slope roof or roof deck. As used herein, a "flat" roof or roof deck is a roof or roof deck that is substantially flat.

In some embodiments, the roof is a gable roof. In some embodiments, the roof is a gambrel roof. In some embodiments, the roof is a hip roof. In some embodiments, the roof is a hip and valley roof. In some embodiments, the roof is a bonnet roof. In some embodiments, the roof is a Dutch gable roof. In some embodiments, the roof is a mansard roof. In some embodiments, the roof is a jerkinhead roof.

In some embodiments, the reveal portion 18 of one of the photovoltaic modules 10 in the subarray S1 overlays a head lap portion 16 of an adjacent another one of the photovoltaic modules 10 of the subarray S1. In some embodiments, at least a portion of a first side lap 22 of the one of the photovoltaic modules 10 overlays at least a portion of the first side lap 22 of the another one of the photovoltaic modules 10. In some embodiments, at least a portion of a second side lap 24 of the one of the photovoltaic modules 10 overlays at least a portion of the second side lap 24 of the another one of the photovoltaic modules 10.

In some embodiments, the first side lap 22 of one of the photovoltaic modules 10 in the subarray S2 overlays the second side lap 24 of an adjacent another one of the photovoltaic modules 10 in the subarray S1 in the same one of the rows In some embodiments, a jumper module 73 overlays an uppermost one of the photovoltaic modules 10 in a column of the subarray S1. In some embodiments, the active portion of the jumper module 73 overlays the head lap portion 16 of the photovoltaic module 10.

In some embodiments, the photovoltaic modules 10 are configured to be installed on a roof deck 102 with one or more fasteners. In some embodiments, the fasteners comprise one or more of nails, screws, staples, rivets, and/or combinations thereof.

Figure 3:
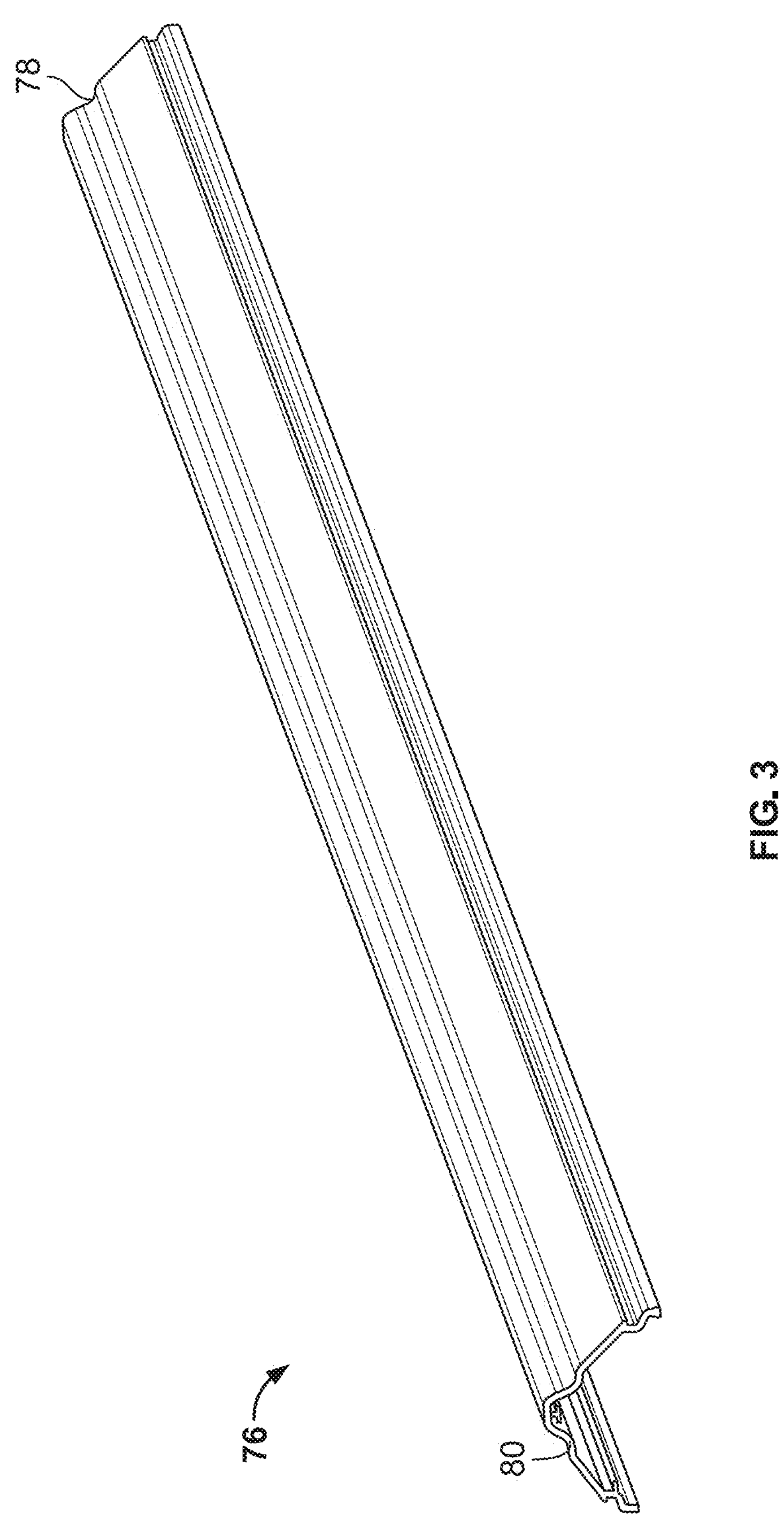
FIG. 3 is a top perspective view of some embodiments of a wire cover employed by the roofing system of FIG. 1.

Referring to FIGS. 1 through 3, in some embodiments, the system 70 includes at least one wireway 74 installed proximate to first ends 12 of the photovoltaic modules 10. In some embodiments, the at least one wireway 74 is installed proximate to a second end 14 of the photovoltaic modules 10. In some embodiments, the at least one wireway 74 is installed intermediate the first end 12 of one of the photovoltaic modules 10 and a second end 14 of another one of the photovoltaic modules 10. In some embodiments, the at least one wireway 74 includes a wire cover 76. In some embodiments, the wire cover 76 includes a first end 78 and a second end 80 opposite the first end 78. In some embodiments, the wire cover 76 is removably attached to the at least one wireway 74. In some embodiments, the at least one wireway 74 includes a plurality of the wireways 74. In some embodiments, one of the wire covers 76 of one of the plurality of wireways 74 overlaps another of the wire covers 76 of another of the plurality of wireways 74. In some embodiments, the at least one wireway 74 includes a height of 1 mm to 20 mm. In some embodiments, the at least one wireway 74 includes a single wireway installed proximate to the first end of each of the photovoltaic modules 10. In some embodiments, the at least one wireway 74 does not include any electrical components or electrical wires or cables therein. In some embodiments, the at least one wireway 74 and the wire covers 76 include a structure, composition and/or function of similar to those of more or one of the embodiments of the wireways and wire covers disclosed in PCT International Patent Publication No. WO 2022/051593, Application No. PCT/US2021/049017, published Mar. 10, 2022, titled "Building Integrated Photovoltaic System," owned by GAF Energy LLC; U.S. Pat. No. 11,251,744 to Bunea et al., issued Feb. 15, 2022, titled "Photovoltaic Shingles and Methods of Installing Same, owned by GAF Energy LLC;" U.S. Pat. No. 11,870,227, issued Jan. 9, 2024, titled "Building Integrated Photovoltaic System," owned by GAF Energy LLC; and/or U.S. Pat. No. 12,013,153 to Clemente et al., issued Jun. 18, 2024, titled "Building Integrated Photovoltaic System," and owned by GAF Energy LLC, the disclosures of each of which are incorporated by reference herein in their entireties. In some embodiments, the at least one wireway 74 and the wire covers 76 include a structure, composition and/or function of similar to those of more or one of the embodiments of the wireways and wire covers disclosed in U.S. Pat. No. 12,009,782 to West et al., issued Jun. 11, 2024, titled "Photovoltaic Systems with Wireways," and owned by GAF Energy LLC, the disclosure of which is incorporated by reference herein in its entirety.

Figure 4:
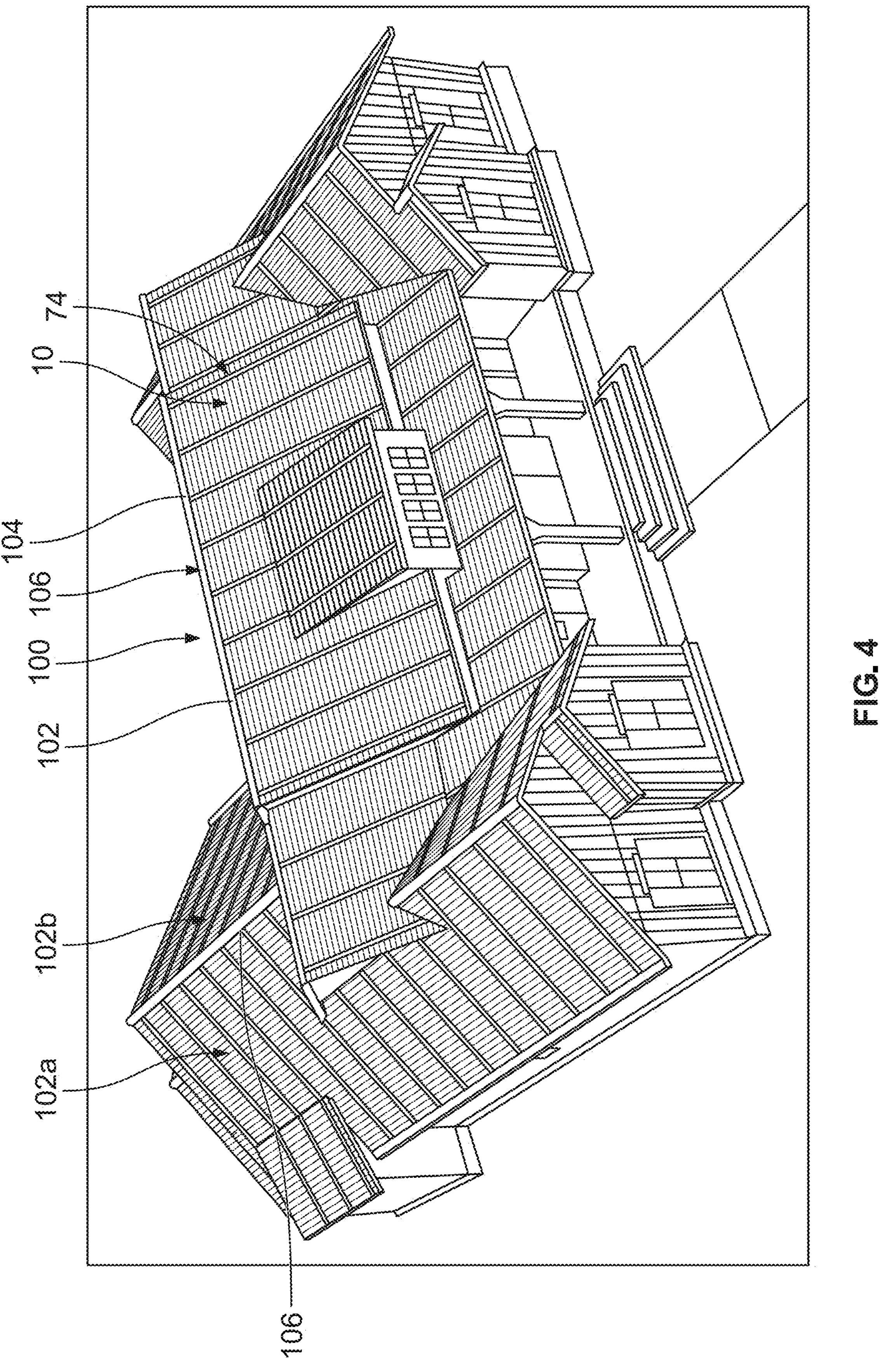
FIG. 4 is top perspective view of some embodiments of a roofing system.
Figure 5:
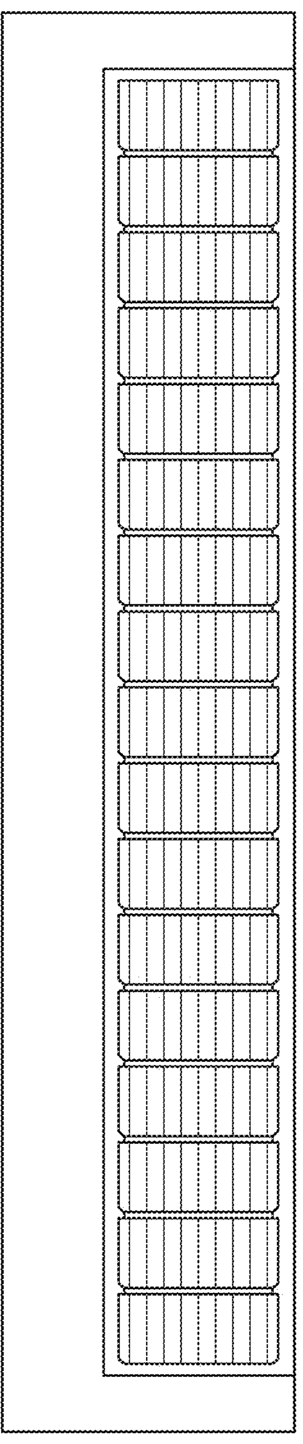
FIG. 5 is a top plan view of some embodiments of a roofing module employed by the roofing system of FIG. 4.

Referring to FIGS. 4 and 5, in some embodiments, the roofing modules 10 are non-photovoltaic roofing modules 10. In some embodiments, the non-photovoltaic module 10 is a cuttable roofing module. In some embodiments, the roofing module 10 includes a cap layer and a core layer. In some embodiments, the roofing module 10 is textured. In some embodiments, the roofing module 10 includes a printed pattern. In some embodiments, the printed pattern includes a depiction of solar cells. In some embodiments, the roofing modules 10 are roofing shingles 10. In some embodiments, the roofing module 10 includes a structure, composition and/or function of similar to those of more or one of the embodiments of the roofing modules disclosed in in U.S. application Ser. No. 17/831,307, filed Jun. 2, 2022, titled "Roofing Module System," and published under U.S. Patent Application Publication No. 2022-0393637 on Dec. 8, 2022; and/or U.S. application Ser. No. 18/169,718, filed Feb. 15, 2023, titled "Roofing Module System," and published under U.S. Patent Application Publication No. 2023-0203815 on Jun. 29, 2023; and/or U.S. application Ser. No. 18/352,894, filed Jul. 14, 2023, titled "Solar Roofing System with Fiber Composite Roofing Shingles," and published under U.S. Patent Application Publication No. 2024-0018781 on Jan. 18, 2024, the disclosures of each of which are incorporated by reference herein in their entireties.

Figure 6:
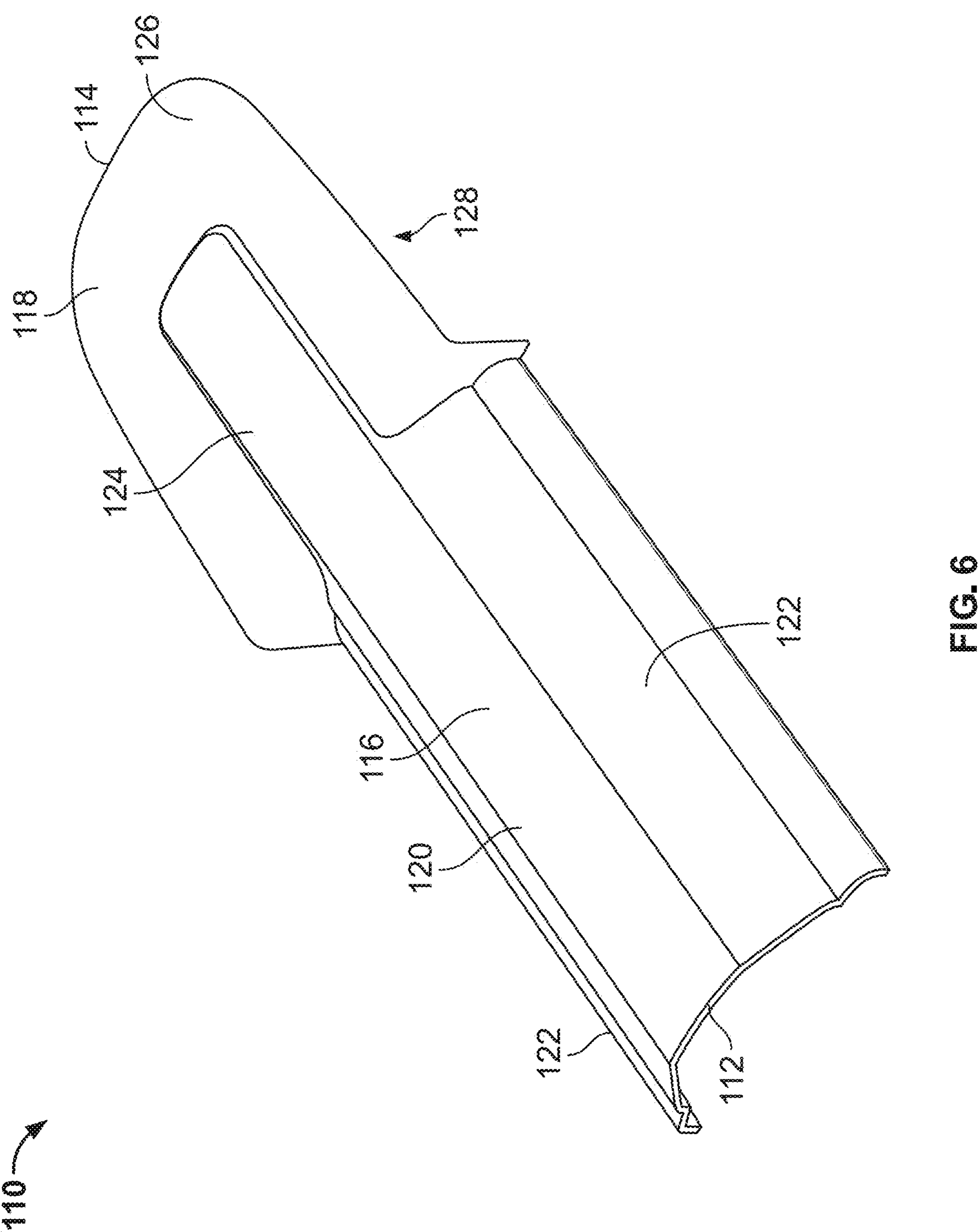
FIG. 6 is a top perspective view of some embodiments of a ridge roof joiner employed by the wire cover of FIG. 3.

Referring to FIG. 6, in some embodiments, a roof ridge joiner 110 ("joiner 110") includes a first end 112, a second end 114 opposite the first end 112, and an elongated body 116 extending from the first end 112 to a location intermediate the first end 112 and the second end 114. In some embodiments, a tab 118 extends from the body 116 at the second end 114. In some embodiments, the body 116 includes a top section 120 and side sections 122 extending from the top section 120. In some embodiments, each of the side sections 122 extend obliquely from the top section 120. In some embodiments, the body 116 includes a size, shape, cross-section and/or structure similar to those of the wire cover 76. In some embodiments, the tab 118 includes a top section 124 and an upper, flanged portion 126 extending from the top section 124. In some embodiments, the tab 118 is elevated relative to a lower portion of the body 116 and, in turn, a space 128 is located therebetween. In some embodiments, the tab 118 at the second end 114 includes a rounded-shaped end, a circular-shaped end, a square-shaped end, a curvilinear-shaped end, a rectangular-shaped end, a triangular-shaped end, a pointed end, or a polygonal-shaped end.

In some embodiments, the joiner 110 has a height of 1 mm to 20 mm. In some embodiments, the joiner 110 has a height of 1 mm to 15 mm. In some embodiments, the joiner 110 has a height of 1 mm to 10 mm. In some embodiments, the joiner 110 has a height of 1 mm to 5 mm. In some embodiments, the joiner 110 has a height of 5 mm to 20 mm. In some embodiments, the joiner 110 has a height of 5 mm to 15 mm. In some embodiments, the joiner 110 has a height of 5 mm to 10 mm. In some embodiments, the joiner 110 has a height of 10 mm to 20 mm. In some embodiments, the joiner 110 has a height of 10 mm to 15 mm. In some embodiments, the joiner 110 has a height of 15 mm to 20 mm.

Figure 7:
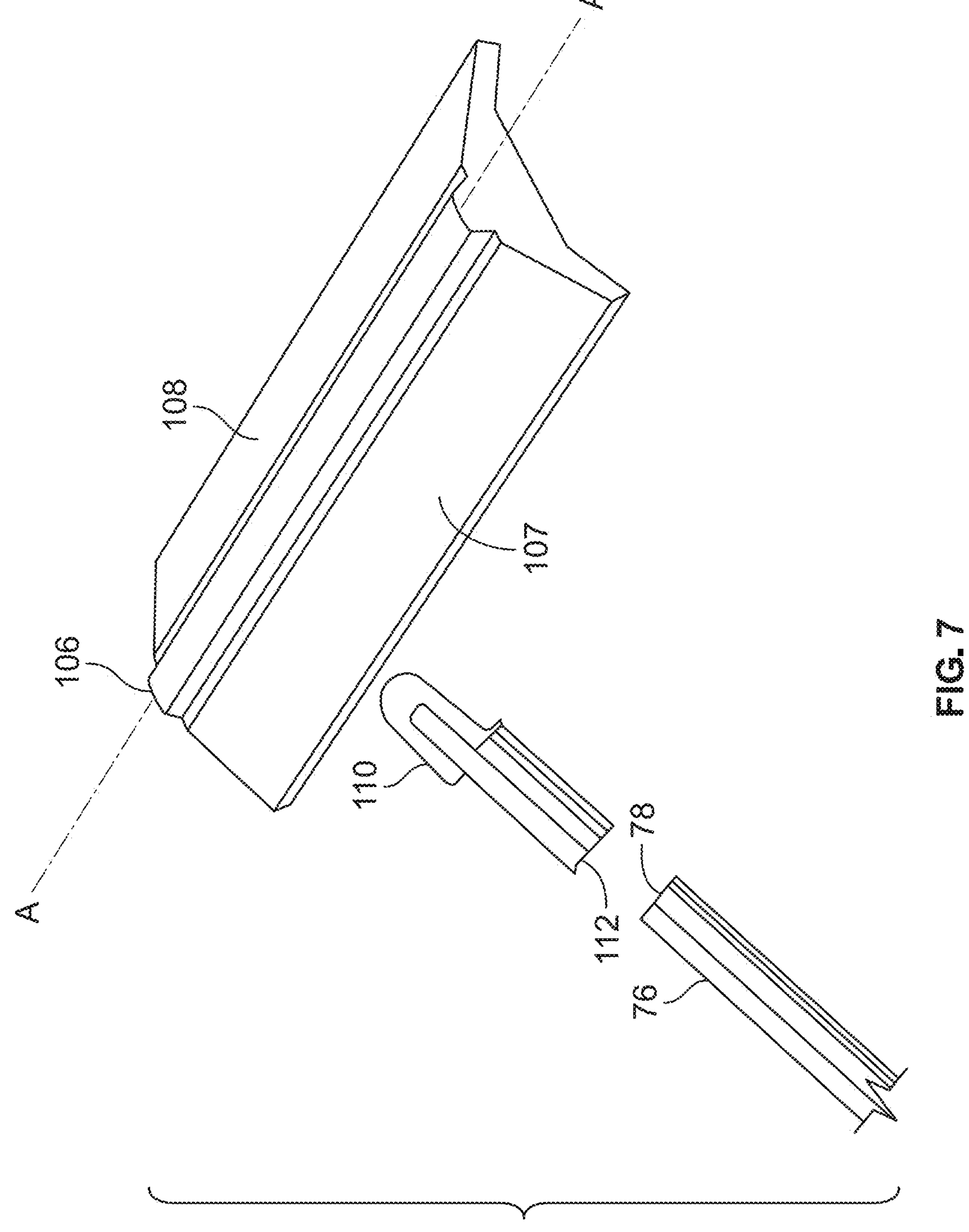
FIG. 7 is an exploded view of some embodiments of the ridge roof joiner of FIG. 6 with a wire cover and a ridge cap of a roof.

Referring to FIG. 7, in some embodiments, the joiner 110 is attached to the wire cover 76. In some embodiments, the joiner 110 is removably attached to the wire cover 76. In some embodiments, the first end 112 of the joiner 110 is attached to the first end 78 of the wire cover 76. In some embodiments, the joiner 110 is attached to the wire cover 76 by snap tabs thereon. In some embodiments, the respective snap tabs are integral with the joiner 110 and the wire cover 76. In some embodiments, the joiner 110 is attached to the wire cover 76 by fasteners, such as screws, clips, and hooks. In some embodiments, the joiner 110 is attached to the wire cover 76 by an adhesive. In some embodiments, the joiner 110 is attached to the wire cover 76 by features and structures as disclosed in PCT International Patent Publication No. WO 2022/051593, Application No. PCT/US2021/049017, published Mar. 10, 2022, titled "Building Integrated Photovoltaic System," owned by GAF Energy LLC; U.S. Pat. No. 11,251,744 to Bunea et al., issued Feb. 15, 2022, titled "Photovoltaic Shingles and Methods of Installing Same, owned by GAF Energy LLC;" and U.S. Pat. No. 11,870,227, issued Jan. 9, 2024, entitled "Building Integrated Photovoltaic System," owned by GAF Energy LLC; and/or U.S. Pat. No. 12,013,153 to Clemente et al., issued Jun. 18, 2024, entitled "Building Integrated Photovoltaic System," owned by GAF Energy LLC, the contents of each of which are incorporated by reference herein in their entirety. In some embodiments, the joiner 110 is integral with the wire cover 76 and is the first, upper end thereof. In some embodiments, the joiner 110 and the wire cover 76 are a single component.

In some embodiments, the joiner 110 is plastic. In some embodiments, the joiner 110 is composed of a polymer. In some embodiments, the joiner 110 is composed of metal.

In some embodiments, the ridge 104 includes a ridge cap 106. In some embodiments, the ridge cap 106 is installed on the ridge 104. In some embodiments, the ridge cap 106 in composed of a polymer. In some embodiments, the ridge cap 106 in composed of a metal. In some embodiments, the ridge cap 106 in composed of wood. In some embodiments, the ridge cap 106 includes asphalt. In some embodiments, the ridge cap 106 includes asphalt roof shingles. In some embodiments, the ridge cap 106 in composed of asphalt. In some embodiments, the ridge cap 106 includes a ridge cap cover. In some embodiments, the ridge cap 106 includes a first side 107 and a second side 108. In some embodiments, the first side 107 is sloped. In some embodiments, the second side 108 is sloped. In some embodiments, each of the first side 107 and the second side 108 is sloped. In some embodiments, the ridge cap 106 is symmetrical. In some embodiments, the ridge cap 106 is asymmetrical. In some embodiments, the ridge cap 106 has a substantially triangular-shaped cross section. In some embodiments, the ridge cap 106 has a triangular-shaped cross section. In some embodiments, the ridge cap 106 has a semi-elliptical-shaped cross section. In some embodiments, the ridge cap 106 has a square-shaped cross section. In some embodiments, the ridge cap 106 has a rectangular-shaped cross section. In some embodiments, the ridge cap 106 has a semi-circular-shaped cross section. In some embodiments, the ridge cap 106 has a polygonal cross section.

In some embodiments, the joiner 110 overlays the ridge cap 106. In some embodiments, the tab 118 overlays the first side 107 of the ridge cap 106. In some embodiments, the tab 118 overlays the second side 108 of the ridge cap 106. In some embodiments, the tab 118 overlays at least a portion of the ridge cap 106. In some embodiments, the space 128 of the joiner 110 is sized and shaped to receive the first side 107 or the second side 108. In some embodiments, the tab 118 is in contact with the at least a portion of the ridge cap 106. In some embodiments, the tab 118 is attached to the ridge cap 106. In some embodiments, the tab 118 is removably attached to the ridge cap 106. In some embodiments, the tab 118 is attached to the ridge cap 106 by screws, nails, staples, rivets, or an adhesive. In some embodiments, the joiner 110 is perpendicular to a longitudinal axis A-A of the ridge cap 106. In some embodiments, the joiner 110 is substantially perpendicular to a longitudinal axis A-A of the ridge cap 106.

Figure 8:
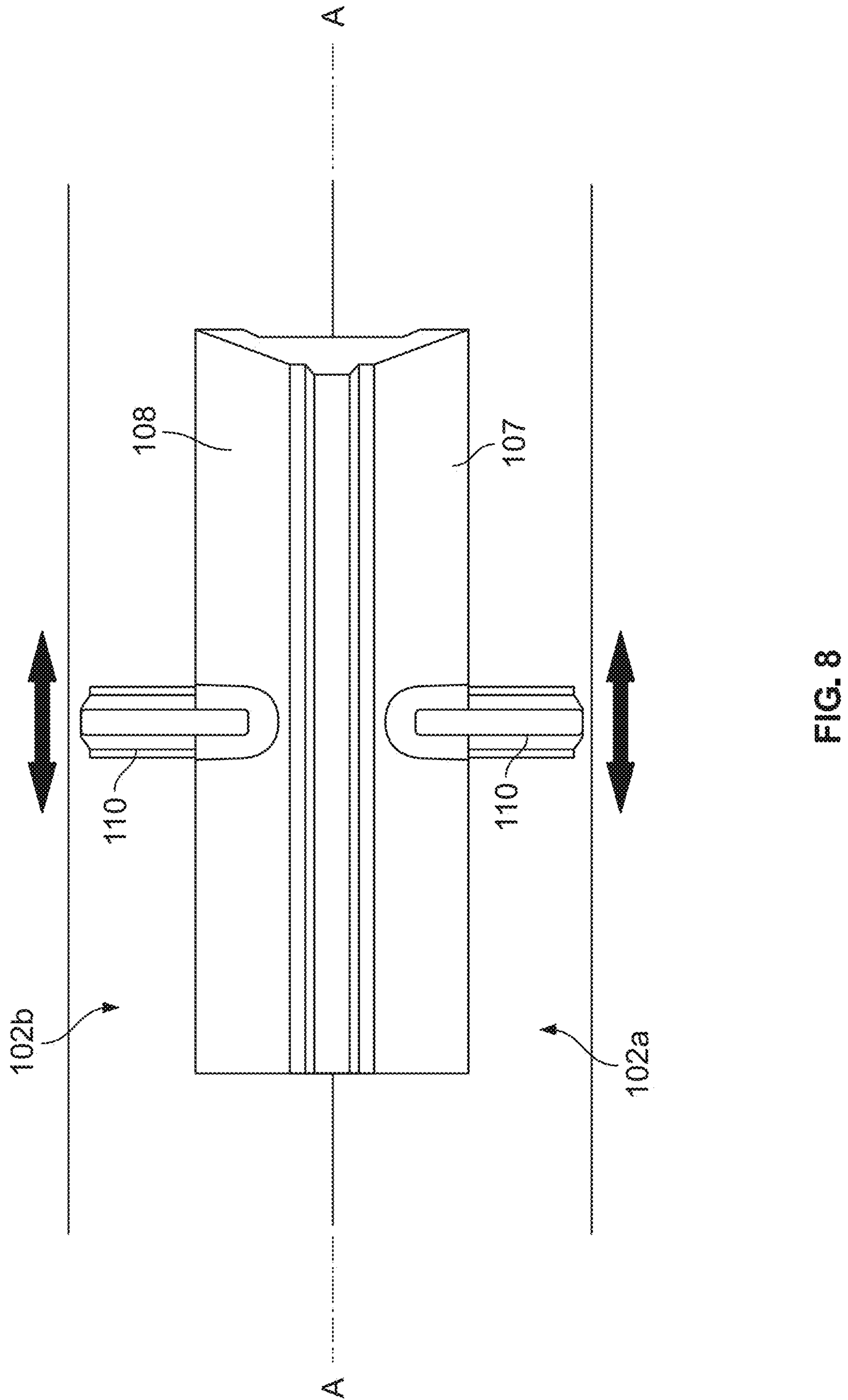
FIG. 8 is a top plan view of some embodiments of two of the ridge roof joiners, the wire cover and the ridge cap of FIG. 7.
Figure 9:
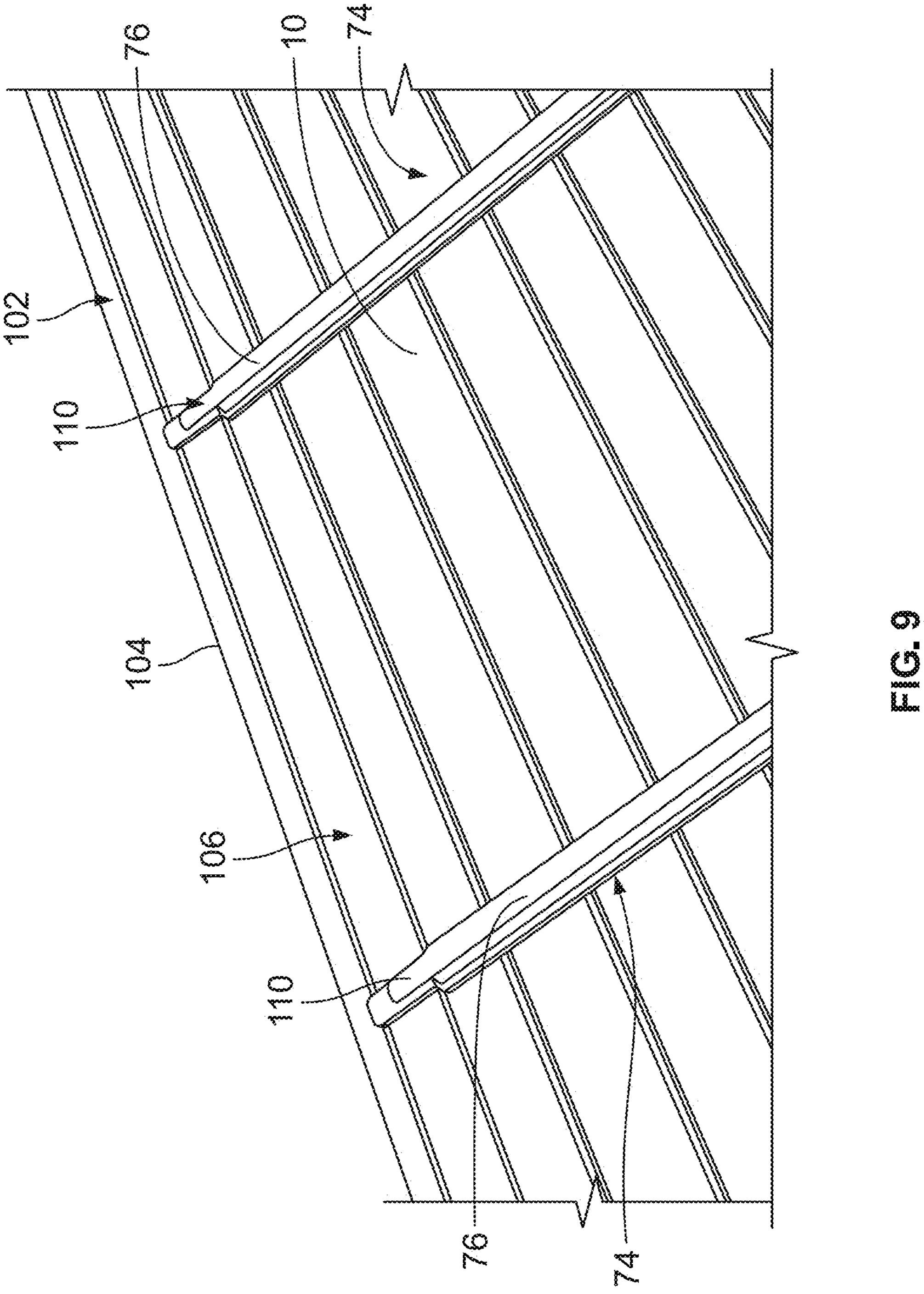
FIG. 9 is a perspective view of a roofing system employing a plurality of the ridge roof joiners of FIG. 6.

Referring to FIGS. 8 and 9, in some embodiments, the wire cover 76 and, in turn, the joiner 110, are moveable in at least a first direction along the longitudinal axis A-A of the ridge cap 106. In some embodiments, the wire cover 76 and the joiner 110 are moveable in at least the first direction along the longitudinal axis A-A of the ridge cap 106 that extends along the first side 107 of the ridge cap 106. In some embodiments, the wire cover 76 and the joiner 110 are moveable in at least the first direction along the longitudinal axis A-A of the ridge cap 106 that extends along the second side 108 of the ridge cap 106. In some embodiments, the at least a first direction includes a second direction opposite the first direction. In some embodiments, the position of the joiner 110 along the first side 107 or the second side 108 of the ridge cap 106 is adjustable. In some embodiments, the position of the joiner 110 along the first side 107 or the second side 108 of the ridge cap 106 is adjustable in either the first direction or the second direction.

In some embodiments, the position of the wire cover 76 and the joiner 110 along the first side 107 or the second side 108 of the ridge cap 106 is adjustable in either the first direction or the second direction by 0.1 inch to 10 inches. In some embodiments, the position of the wire cover 76 and the joiner 110 is adjustable in either the first direction or the second direction by 0.1 inch to 5 inches. In some embodiments, the position of the wire cover 76 and the joiner 110 is adjustable in either the first direction or the second direction by 0.1 inch to 1 inch. In some embodiments, the position of the wire cover 76 and the joiner 110 is adjustable in either the first direction or the second direction by 0.1 inch to 0.5 inch. In some embodiments, the position of the wire cover 76 and the joiner 110 is adjustable in either the first direction or the second direction by 0.5 inch to 10 inches. In some embodiments, the position of the wire cover 76 and the joiner 110 is adjustable in either the first direction or the second direction by 0.5 inch to 5 inches. In some embodiments, the position of the wire cover 76 and the joiner 110 is adjustable in either the first direction or the second direction by 0.5 inch to 1 inch. In some embodiments, the position of the wire cover 76 and the joiner 110 is adjustable in either the first direction or the second direction by 1 inch to 10 inches. In some embodiments, the position of the wire cover 76 and the joiner 110 is adjustable in either the first direction or the second direction by 1 inch to 5 inches.

In some embodiments, the roofing system 100 includes a plurality of wire covers 76 and a plurality of joiners 110, each of which is attached to or integral with a corresponding one of the plurality of wire covers 76. In some embodiments, a first plurality of the wire covers 76 and the corresponding plurality of the joiners 110 are located on a first portion 102*a* of the roof deck 102. In some embodiments, each of the first plurality of the wire covers 76 are spaced apart from one another. In some embodiments, each of the first plurality of the wire covers 76 are spaced apart from one another in a direction along the longitudinal axis A-A of the ridge cap 106. In some embodiments, the first plurality of the wire covers 76 and the corresponding plurality of the joiners 110 are located on a second portion 102*b* of the roof deck 102. In some embodiments, each of the first plurality of the wire covers 76 are spaced apart from one another.

In some embodiments, the plurality of joiners 110 overlay the first side of the ridge cap 106. In some embodiments, the plurality of joiners 110 overlay the second side 108 of the ridge cap 106. In some embodiments, a first plurality of the joiners 110 overlay the first side 107 of the ridge cap 106. In some embodiments, a second plurality of joiners 110 overlay the second side 108 of the ridge cap 106.

In some embodiments, the roofing system 100 includes an array of the roofing modules 10 on a first portion 102*a* of the roof deck 102. In some embodiments, the roofing system 100 includes an array of the roofing modules 10 on the first portion 102*a* of the roof deck 102 and on the same side as the first side 107 of the ridge cap 106. In some embodiments, the roofing system 100 includes another array of the roofing modules 10 on a second portion 102*b* of the roof deck 102. In some embodiments, the roofing system 100 includes an array of the roofing modules 10 on the second portion 102*b* of the roof deck 102 and on the same side as the second side 108 of the ridge cap 106. In some embodiments, the first portion 102*a* of the roof deck 102 is a first side of the roof deck and the second portion 102*b* of the roof deck 102 is a second side of the roof deck 102 opposite the first side. In some embodiments, the first side 107 of the ridge cap 106 is over the first side of the roof deck 102. In some embodiments, the second side 108 of the ridge cap 106 is over the second side of the roof deck 102.

In some embodiments, the array of the roofing modules 10 includes a first side and a second side opposite the first side. In some embodiments, a first wireway 74 is installed proximate to the first side of the array. In some embodiments, a second wireway 74 is installed proximate to the second side of the array. In some embodiments, a first wire cover 76 is installed on the first wireway 74. In some embodiments, a second wire cover 76 is installed on the second wireway 74. In some embodiments, a first joiner 110 attached to the first wire cover 76 overlays a first portion of the ridge cap 106. In some embodiments, a second joiner 110 attached to the second wire cover 76 overlays a second portion of the ridge cap 106. In some embodiments, the tab 118 of the first wire cover 76 and the tab 118 of the second wire cover 76 overlay the first side 107 of the ridge cap 106. In some embodiments, each of the first wire cover 76 and the second wire cover 76 is moveable in at least a first direction that extends along the first side 107 of the ridge cap, and each of the tabs 118 of the first wire cover 76 and the second cover 76 is configured to be positioned along the first side 107 of the ridge cap 106.

In some embodiments, the roofing system 100 includes a steep sloped roof. In some embodiments, the steeped sloped roof includes the roof deck 102 and the ridge 104. In some embodiments, the roof deck 102 includes a first portion 102*a* and a second portion 102*b*. In some embodiments, the first portion 102*a* is a first sloped side. In some embodiments, the second portion 102*b* is a second sloped side. In some embodiments, the ridge 104 is between the first portion 102*a* and the second portion 102*b*. In some embodiments, the ridge cap 106 is installed on the ridge 104. In some embodiments, the ridge cap 106 includes the first side 107 and the second side 108. In some embodiments, a first plurality of roofing modules 10 is installed on the first portion 102*a* of the roof deck 102. In some embodiments, the first plurality of roofing modules 10 is a plurality of photovoltaic modules. In some embodiments, the first plurality of roofing modules 10 is a plurality of non-photovoltaic modules. In some embodiments, the first plurality of roofing modules 10 is arranged in a first array. In some embodiments, the first array includes a first side and second side opposite the first side of the first array. In some embodiments, a second plurality of roofing modules 10 is installed on the second portion 102*b* of the roof deck 102. In some embodiments, the second plurality of roofing modules 10 is a plurality of photovoltaic modules. In some embodiments, the second plurality of roofing modules 10 is a plurality of non-photovoltaic modules. In some embodiments, the second plurality of roofing modules 10 is arranged in a second array. In some embodiments, the second array includes a first side and a second side opposite the first side of the second array. In some embodiments, a first wireway 74 is installed proximate to the first side of the first array. In some embodiments, a first wire cover 76 is installed on the first wireway 74. In some embodiments, a second wireway 74 is installed proximate to the second side of the first array. In some embodiments, a second wire cover 76 is installed on the second wireway 74. In some embodiments, a third wireway 74 is installed proximate to the first side of the second array. In some embodiments, a third wire cover 76 is installed on the third wireway 74. In some embodiments, a fourth wireway 74 is installed proximate to the second side of the second array. In some embodiments, a fourth wire cover 76 is installed on the fourth wireway 74. In some embodiments, the tab 118 of the first wire cover 76 overlays a first portion of the first side 107 of the ridge cap 106. In some embodiments, the tab 118 of the second wire cover 76 overlays a second portion of the first side 107 of the ridge cap 106. In some embodiments, the tab 118 of the third cover 76 overlays a first portion of the second side 108 of the ridge cap 106. In some embodiments, the tab 118 of the second wire cover 76 overlays a second portion of the second side 108 of the ridge cap 106.

In some embodiments, each of the first wire cover 76 and the second wire cover 76 is moveable in at least a first direction that extends along the first side 107 of the ridge cap 106. In some embodiments, each of the tabs 118 of the first wire cover 76 and the second wire cover 76 is configured to be positioned along the first side 107 of the ridge cap 106. In some embodiments, each of the third wire cover 76 and the fourth wire cover 76 is moveable in at least a second direction that extends along the second side 108 of the ridge cap 106. In some embodiments, each of the tabs 118 of the third wire cover 76 and the fourth wire cover 76 is configured to be positioned along the second side 108 of the ridge cap 106. In some embodiment, the first wire cover 76 and the second wire cover 76 when installed on the roof are symmetric with the third wire cover 76 and the fourth wire cover 76 when installed on the roof. In some embodiments, the first wire cover 76 and the second wire cover 76 when installed on the roof are asymmetric with the third wire cover 76 and the fourth wire cover 76 when installed on the roof. In some embodiments, the first, second, third and fourth wire covers 76 with the joiners 110 are configured to be positioned either symmetrically or asymmetrically along the ridge line of the ridge 104 to select a desired aesthetic appearance of the roofing system 100. In some embodiments, the wire covers 76 with the joiners 110 are configured to be positioned symmetrically along the ridge line of the ridge 104 to avoid rooftop obstructions that may not allow symmetric positioning of the wire covers 76 on either side of the ridge 104. In some embodiments, such obstructions may include vents, vent pipes, fans such as attic fans, skylights, chimneys, satellite dishes, and HVAC systems. In some embodiments, the joiners 110 are configured to provide aesthetic integration of the wire covers 76 with the ridge cap 106 and any ridge cap covers.

In some embodiments, the plurality of wireways 74 and associated wire covers 76 and joiners 110 may include two or more of the wireways 74 and associated wire covers 76 and joiners 110 on one or each of the first and second sides of the roof. In some embodiments, the plurality of wireways 74 and associated wire covers 76 and joiners 110 may include three or more of the wireways 74 and associated wire covers 76 and joiners 110 on one or each of the first and second sides of the roof. In some embodiments, the plurality of wireways 74 and associated wire covers 76 and joiners 110 may include four or more of the wireways 74 and associated wire covers 76 and joiners 110 on one or each of the first and second sides of the roof. In some embodiments, the plurality of wireways 74 and associated wire covers 76 and joiners 110 may include five or more of the wireways 74 and associated wire covers 76 and joiners 110 on one or each of the first and second sides of the roof. In some embodiments, the plurality of wireways 74 and associated wire covers 76 and joiners 110 may include six or more of the wireways 74 and associated wire covers 76 and joiners 110 on one or each of the first and second sides of the roof. In some embodiments, the plurality of wireways 74 and associated wire covers 76 and joiners 110 may include seven, eight, nine, ten, or more of the wireways 74 and associated wire covers 76 and joiners 110 on one or each of the first and second sides of the roof.

In some embodiments, the roof may have only the one ridge 104. In some embodiments, the roof may have a plurality of the ridges 104. In some embodiments, each of the ridges 104 are parallel to one another. In some embodiments, two of the ridges 104 are perpendicular to one another. In some embodiments, two or more of the ridges 104 may be perpendicular to two or more of other of the ridges 104.

The embodiments described herein are merely exemplary and that a person skilled in the art may make many variations and modifications without departing from the spirit and scope of the invention. All such variations and modifications are intended to be included within the scope of the invention.

What is claimed is:

1. A system, comprising:

a steep sloped roof, wherein the roof includes a roof deck and a ridge;

a ridge cap installed on the ridge;

a plurality of photovoltaic modules installed on the roof deck, wherein the plurality of photovoltaic modules is arranged in an array, wherein the array includes a first side;

a wireway installed proximate to the first side of the array; and a cover installed on the wireway,
wherein the cover includes
an elongated body having an upper end, and
a tab extending from the body at the upper end, and
wherein the tab overlays at least a portion of the ridge cap.

2. The system of claim 1, wherein the body includes a top section and side sections extending from the top section wherein the tab includes an upper portion, and wherein the upper portion of the tab extends from the top section of the body.

3. The system of claim 1, wherein the body includes a first portion and a second portion attached to the first portion, and wherein the second portion includes the tab.

4. The system of claim 3, wherein the second portion is removably attached to the first portion.

5. The system of claim 1, wherein the ridge cap includes a first side, and wherein the tab overlays the first side of the ridge cap.

6. The system of claim 5, wherein the first side of the ridge cap is sloped.

7. The system of claim 5, wherein the cover is moveable in at least a first direction that extends along the first side of the ridge cap, and wherein the tab is configured to be positioned along the first side of the ridge cap.

8. The system of claim 7, wherein the at least a first direction includes a first direction and a second direction opposite the first direction.

9. The system of claim 5, wherein the tab is attached to the first side of the ridge cap.

10. A system, comprising:
a steep sloped roof,
wherein the roof includes a roof deck and a ridge;
a ridge cap installed on the ridge;
a plurality of photovoltaic modules installed on the roof deck,
wherein the plurality of photovoltaic modules is arranged in an array,
wherein the array includes a first side and a second side opposite the first side;
a first wireway installed proximate to the first side of the array;
a second wireway installed proximate to the second side of the array;
a first cover installed on the first wireway; and
a second cover installed on the second wireway,
wherein each of the first cover and the second cover includes an upper end,
wherein the upper end of the first cover overlays a first portion of the ridge cap, and
wherein the upper end of the second cover overlays a second portion of the ridge cap.

11. The system of claim 10, wherein each of the first cover and the second cover includes an elongated body and a tab extending from the body at the upper end thereof, and wherein the tab of the first cover overlays the first portion of the ridge cap and the tab of the second cover overlays the second portion of the ridge cap.

12. The system of claim 11, wherein the body of each of the first cover and the second cover includes a first portion and a second portion attached to the first portion of the body, and wherein the second portion of the body includes the tab.

13. The system of claim 12, wherein the second portion of the body of each of the first cover and the second cover is removably attached to the first portion of the body.

14. The system of claim 11, wherein the ridge cap includes a first side, wherein the tab of the first cover and the tab of the second cover overlay the first side of the ridge cap.

15. The system of claim 14, wherein each of the first cover and the second cover is moveable in at least a first direction that extends along the first side of the ridge cap, and wherein each of the tabs of the first cover and the second cover is configured to be positioned along the first side of the ridge cap.

16. A system, comprising:
a steep sloped roof,
wherein the roof includes a roof deck and a ridge,
wherein the roof deck includes a first sloped side and a second sloped side, wherein the ridge is between the first sloped side and the second sloped side;
a ridge cap installed on the ridge,
wherein the ridge cap includes a first side and a second side;
a first plurality of photovoltaic modules installed on the first sloped side of the roof deck,
wherein the first plurality of photovoltaic modules is arranged in a first array,
wherein the first array includes a first side and second side opposite the first side of the first array;
a second plurality of photovoltaic modules installed on the second sloped side of the roof deck,
wherein the second plurality of photovoltaic modules is arranged in a second array,
wherein the second array includes a first side and a second side opposite the first side of the second array;
a first wireway installed proximate to the first side of the first array;
a first cover installed on the first wireway;
a second wireway installed proximate to the second side of the first array;
a second cover installed on the second wireway,
a third wireway installed proximate to the first side of the second array;
a third cover installed on the third wireway; and
a fourth wireway installed proximate to the second side of the second array; and
a fourth cover installed on the fourth wireway,
wherein each of the first cover, the second cover, the third cover and the fourth cover includes
an elongated body having an upper end, and
a tab extending from the body at the upper end,
wherein the tab of the first cover overlays a first portion of the first side of the ridge cap,
wherein the tab of the second cover overlays a second portion of the first side of the ridge cap,
wherein the tab of the third cover overlays a first portion of the second side of the ridge cap, and
wherein the tab of the second cover overlays a second portion of the second side of the ridge cap.

17. The system of claim 16, wherein each of the first cover and the second cover is moveable in at least a first direction that extends along the first side of the ridge cap, wherein each of the tabs of the first cover and the second cover is configured to be positioned along the first side of the ridge cap, wherein each of the third cover and the fourth cover is moveable in at least a second direction that extends along the second side of the ridge cap, and wherein each of the tabs of the third cover and the fourth cover is configured to be positioned along the second side of the ridge cap.

18. The system of claim 17, wherein the first cover and the second cover are symmetric with the third cover and the fourth cover.

19. The system of claim 17, wherein the first cover and the second cover are asymmetric with the third cover and the fourth cover.

* * * * *